United States Patent Office

3,442,737
Patented May 6, 1969

3,442,737
BONDING POLY(BUTENE-1)
Thomas G. Reed, Jr., La Porte, and Robert E. Hinkson, Houston, Tex., assignors to Petro-Tex Chemical Corporation, Houston, Tex., a corporation of Delaware
No Drawing. Filed Dec. 16, 1963, Ser. No. 330,543
Int. Cl. B65h 69/02; C09j 5/06, 5/02
U.S. Cl. 156—158
4 Claims

ABSTRACT OF THE DISCLOSURE

A method for bonding poly(butene-1) surfaces wherein the surfaces are contacted with tetrachloroethylene at a temperature of from about 80° C. to about 120° C. for at least 5 seconds, and thereafter fitting the treated surfaces together.

---

This invention relates to bonding butene-1 polymer surfaces and relates more particularly to solvent welding poly(butene-1).

Solid poly(butene-1) is a valuable polyolefin and is used to form a variety of molded and extruded articles. Poly(butene-1) and articles fabricated therefrom are flexible, of commercial value and have certain valuable characteristics including retention of physical properties over a wide range of temperatures, are not subject to stress cracking, and have high yield strength and excellent resistance to creep. Bonding parts and articles of poly(butene-1) together to form unitary articles has been difficult. While cements have been used for bonding poly(butene-1) surfaces, a more versatile and improved method for bonding butene-1 polymers has been sought.

We have now discovered quite unexpectedly that poly(butene-1) parts and articles can be bonded together in a bond as strong or stronger than the article by means of a solvent welding technique wherein the articles to be bonded are treated with tetrachloroethylene at a temperature above 80° C. for greater than 5 seconds and are thereafter joined together. For example, in bonding a piece of poly(butene-1) pipe to a poly(butene-1) fitting, the areas to be bonded together are treated with tetrachloroethylene at a temperature of 90° C. for 10 seconds and the pipe and fitting joined together and allowed to dry. Such a bond is stronger than the pipe as shown by flex and burst tests. When such joints are made at a temperature below about 80° C., the bond is generally not satisfactory. At a contact time of tetrachloroethylene and surface to be bonded of less than 5 seconds, a satisfactory bond is not normally obtained. The temperature range that the surface to be bonded is subjected to is from about 80° C. to about 120° C. at contact times from about 5 seconds to 5 minutes or more. In commercial operations the shorter contact times are preferred. Within this range the time-temperature relation can be varied considerably. At extremely long contact times the article may be attacked by the solvent, although this may not be objectionable. Normally, a temperature range of about 85° C. to 110° C. for 10 seconds to two minutes is used. Good results have been obtained under process conditions equivalent to contact times of 10 to 90 seconds at temperatures of 85° C. to 110° C.

The poly(butene-1) used in the process of this invention is stereo-regular isotactic polymer which may be provided by a number of processes which are known to those skilled in the art. Such polymers include homopolymers of butene-1 as well as copolymers of butene-1 with other α-olefins containing 2 to 12 carbon atoms, as ethylene, propylene, 4-methylpentene-1, styrene, hexene, and 3-methyl butene-1. Preferably the copolymers contain more than 50 percent butene-1. Generally, butene-1 is polymerized with the so-called Ziegler organometallic type catalysts by a stereospecific polymerization using a variety of catalysts which normally are a combination of compounds of Groups IV through VIII transition elements in an oxidation state lower than the maximum and metal hydrides or metal alkyls and the like. Such polymerization systems and the catalysts therefor are described in a number of literature sources, including the patent literature, and more comprehensively in such publications as Linear and Stereoregular Addition Polymer, Norman G. Gaylor and Herman F. Mark, 1954, Interscience Publications, Inc., N.Y., and the article appearing in the Petroleum Refiner, November 1960, Polyolefin Processes Today, Marshall Sittig.

Normally, compounds of metals of Groups IV through VI are employed with compounds of Groups I through III metals. High yields of isotactic poly(butene-1) are obtained with the polyhalides of Groups IV through VI metals, particularly titanium tetrachloride, and the trichloride which may be derived from the tetrachloride, and with alkyl aluminum compounds, including particularly alkyl aluminum halides, such as trietyl aluminum, tributyl aluminum, ethyl aluminum dichloride, diethyl aluminum chloride, ethyl aluminum sesquichloride and the like. The aluminum compound is normally used in molar excess to the titanium compound. The polymerizations may be conducted in buik, solution, or dispersion, as with an inert hydrocarbon, with an amount of catalyst sufficient to provide the desired conversion to polymer. The amount of catalyst employed is normally from about 0.01 to about five percent of the butene-1 being polymerized. The polymerization may be conducted, depending upon the particular catalyst system, over a wide range of temperatures, from about 0° C. to about 200° C., but more normally are conducted at temperatures within the range of about 30° C. to about 125° C., and at pressures below about 50 atmospheres. The resulting polymers may be isolated from the reaction medium by precipitation, filtration and the like, and such polymers either before or after precipitation, treated as by washing with water and/or alcohols to remove catalyst residue. The polymers are then dried.

The particular method employed to prepare poly(butene-1) is not critical in accordance with this invention so long as the resulting poly(butene-1) has a density above 0.88 (grams/ml. at 25° C.). Another bench mark for characterizing such polymers is by X-ray methods, and these polymers contain more than 20 percent isotactic, stereoregular or crystalline structures by this method. Such polymers may also be characterized as containing more than 50 percent ether insolubles, having densities within the range of about 0.88 to about 0.93, melt indexes from 0.01 to about 5, and tensile yield strengths from about 500 p.s.i. to about 3500 p.s.i. For applications involving molded and extruded goods, particularly pipe, the density is preferably in the range of about 0.9 to about 0.92 with a tensile yield strength above 1000 p.s.i., preferably from about 1500 p.s.i. to about 3000 p.s.i. The melt index of such polymers at 190° F. should be between about 0.01 to 2 for pipe use. The Shore D hardness of such materials will be between about 35 and 75.

To demonstrate the necessity of the critical temperature and contact time in making satisfactory bonds, a number of poly(butene-1) test strips, 2″ x ½ x ¹⁄₁₆″, were prepared. These strips were solvent welded together by dipping the test strips into heated tetrachloroethylene at the indicated temperature and time. The treated surfaces were clamped together and allowed to dry for several hours. The bonded strips were tested by pulling at a rate of 20 inches per minute to determine the strength of the bond. The data obtained are set forth in the following table.

TABLE

| Solvent temperature, °C. | Solvent, Poly(butene-1), contact time, seconds | Failure, pounds of force |
|---|---|---|
| 25 | 30 | [1] 0 |
| 60 | 30 | [1] 51 |
| 80 | 5 | [2] 92 |
| 80 | 15 | [2] 107 |
| 100 | 300 | [2] 108 |
| 110 | 5 | [2] 115 |
| 110 | 10 | [2] 102 |
| 110 | 20 | [2] 115 |

[1] Bond failed.
[2] Strip failed.

It is obvious from the data in Table I that the temperature and time of contact of the poly(butene-1) with tetrachloroethylene are critical. The minimum solvent temperature required is about 80° C. and the contact time is 5 or more seconds. At a tetrachloroethylene temperature of 80° C. and a dip time of 15 seconds, a bond is obtained which is stronger than the polymer of the test strip. In the data table in all examples where the failure in pound of force is greater than 100, the test strip failed, not the bond. Attempts were made to solvent weld polyethylene and polypropylene in the same manner and at a solvent temperature of 110° C. and a dip time of 60 seconds; both materials failed at the bond at zero pounds of force applied.

Extruded pipe and fittings were prepared from poly(butene-1) containing 23 weight percent of a high abrasion furnace black. This composition was prepared by adding carbon black to the poly(butene-1) in an internal mixer. This material had a melt index of 0.2 gr./10 minutes, a density of 1.07 gr./ml., a yield point of 2500 p.s.i., tensile strength of 2550 p.s.i., an elongation of 100 percent, and a Shore D hardness value of 66. This polymer was extruded into pipe sections having an outside diameter of 1.315 inches and a wall thickness of 0.065 inch. Female fittings to join sections of pipe were molded from the same carbon black containing compound. A fitting and two sections of pipe were dipped into tetrachloroethylene at a temperature of 110° C. for 30 seconds and immediately joined. After drying, the pipe joints were subjected to static pressure tests of 200 p.s.i.g. and to quick burst tests where the pressure was raised rapidly until a failure occured. In both tests the point of failure was in the pipe and not in the bonded joint. In another experiment where the contact time of the pipe in the tetrachloroethylene was less than 5 seconds, the point of failure was the bonded joint.

A section of test pipe was prepared from short sections of 1.315 O.D. poly(butene-1) pipe with 7 couplings, 3 T's and 3 L's molded from the same poly(butene-1) used for the pipe, for a total of 30 solvent welded joints. This structure was filled with water at a pressure of 65 p.s.i.g. This pipe section was then placed in an outdoor area and after five months the joints were still satisfactory and no failure at the solvent welded joints was observed.

In another experiment the pipe and fittings were heated to 100° C. and dipped into tetrachloroethylene for 6 seconds and then pressed together. This technique is satisfactory, and good results are obtained.

We claim:

1. A method for bonding butene-1 polymer surfaces together, wherein the butene-1 polymer is at least 20 percent isotactic, containing more than 50 percent ether insolubles, stereoregular, and has a density above 0.88, which comprises contacting the butene-1 polymer surfaces to be bonded with tetrachloroethylene at a temperature from about 80° C. to about 120° C. for at least 5 seconds and thereafter fitting the treated surfaces together.

2. A method for bonding poly(butene-1) surfaces together, wherein the poly(butene-1) is at least 20 percent isotactic, containing more than 50 percent ether insolubles, stereoregular, and has a density above 0.88, which comprises solvent welding said surfaces by contacting the surface to be bonded with tetrachloroethylene at a temperature between about 80° C. and about 120° C. for greater than 5 to about 300 seconds and joining the treated surfaces.

3. A method for bonding poly(butene-1) pipe and fittings, wherein the poly(butene-1) is at least 20 percent isotactic, containing more than 50 percent ether insolubles, stereoregular, and has a density above 0.88, which comprises solvent welding said pipes and fittings by treating the pipes and fittings in the areas to be bonded together with tetrachloroethylene at a temperature and time equivalent to about 85° C. to 110° C. and for about 10 seconds to less than 5 minutes, joining said pipes and fittings and allowing to dry.

4. A method for bonding poly(butene-1) pipes and fittings, wherein the poly(butene-1) is at least 20 percent isotactic, containing more than 50 percent ether insolubles, stereoregular, and has a density above 0.88, which comprises dipping said pipes and fittings into tetrachloroethylene at a temperature and for a time equivalent to about 85° C. to 110° C. for 10 seconds to 3 minutes, joining said dipped pipes and fittings together and drying.

References Cited

UNITED STATES PATENTS

| 3,132,983 | 5/1964 | Osborne et al. | 156—308 |
| 3,188,258 | 6/1965 | Young | 156—158 |

OTHER REFERENCES

Skeist, I, Handbook of Adhesives, Reinhold Pub. Corp., N.Y., 1962, p. 223.

EARL M. BERGERT, *Primary Examiner.*

C. B. COSBY, *Assistant Examiner.*

U.S. Cl. X.R.

156—308, 334; 161—255; 260—33.6